INVENTOR.
Charles A. Morchand

June 14, 1966 C. A. MORCHAND 3,256,386

AURAL VISUAL MULTIPLEX INFORMATION DISPLAY SYSTEM

Filed Jan. 23, 1963 2 Sheets-Sheet 2

INVENTOR.
Charles A. Morchand 3,256,386
Patented June 14, 1966

3,256,386
AURAL VISUAL MULTIPLEX INFORMATION DISPLAY SYSTEM

Charles A. Morchand, 288 Lexington Ave., New York, N.Y.

Filed Jan. 23, 1963, Ser. No. 253,354
11 Claims. (Cl. 178—5.6)

This invention relates to information transfer systems and more particularly to improvements in my Patent No. 3,008,000 for Action-Reaction Television System as well as in my co-pending application, Serial No. 103,565 for an Information Presentation System.

Although the patent and the co-pending application describe systems which admirably perform the roles of an educational and amusement device, it is a general object of the present invention to provide improvements in such systems.

It is another general object of the invention to provide an improved system of the class described which is much less complex.

It is a further object of the invention to provide a system of the class described which is more compact and less expensive.

It is still another object of the invention to provide a system of the class described which can be incorporated in present television receivers with a minimum amount of extra parts or can be supplied as an adapter to presently available television systems.

Briefly, the invention contemplates a television system which includes means for generating frames of video signals wherein each frame includes different portions related to different visual information. Means are provided for generating control signals. Each of the control signals has a different characteristic such as frequency. The control signals and the video signals are transmitted to a receiving means. Associated with the receiving means is a plurality of control signal detectors each of which is responsive to a different one of the characteristics of the control signals. Accordingly, each of the detectors is capable of detecting a different one of the control signals. There is also included a plurality of subject operable selector means, each associated with one of the detector means. Display means display the video signals. The display means is capable of displaying the visual information represented by entire frames of the video signals. Means responsive to the plurality of detector means and the plurality of subject operable switching means control the display means to permit it to display certain portions of the frames when a detctor means detects its associated control signal and the related selector means is operated.

Other objects, features and advantages of the invention will be evident from the following detailed description when read in connection with the accompanying drawings wherein.

Figure 2:
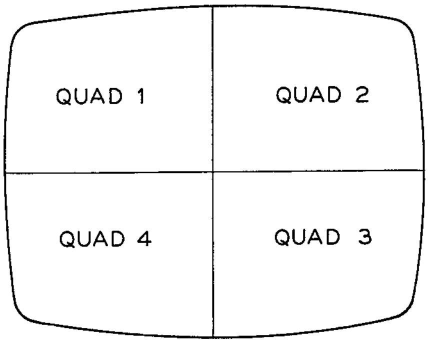
FIGURE 2 shows a frame of the video signals which is divided into four quadrants.
Figure 3:
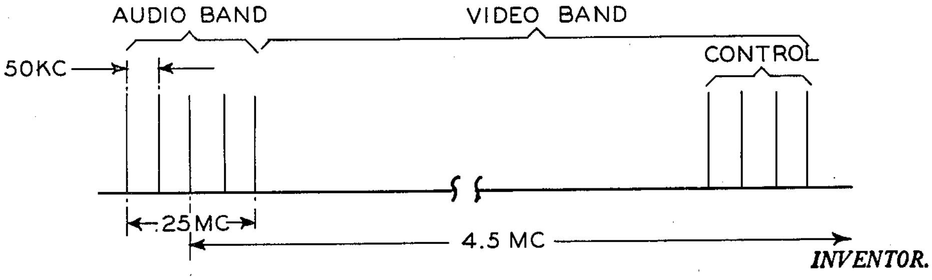
FIGURE 3 is a wave diagram of the signals transmitted from the transmitter of FIGURE 1.

The transmitter of FIGURE 1 will be described by making references to FIGURES 2 and 3. The transmitter of FIGURE 1 which includes a conventional television transmitter having its output connected to a transmitting antenna 12, receives signals from an audio combiner 14, a four quadrant video source 16 and a control signal generator 18. The television transmitter 10 will transmit frames of video signals as shown in FIGURE 2. Each of the frames comprises, for example, four quadrants. Each quadrant is in itself a self-contained picture. Therefore, the frame is actually a composite of four pictures. The composite of four pictures is transmitted from the four quadrant video source 16 to the television transmitter 10. The four quadrant video source may be, for example, a conventional motion picture film wherein each frame of the film is divided into quadrants with each quadrant containing a different picture. The four quadrant video source 16 can also include a plurality of conventional television cameras each focused on different scenes and by means of conventional synchronizing, masking and superimposing circuits, a four quadrant video frame can be formed. Associated with each of the quadrants is its own audio signal. The four different audio signals can be combined in an audio signal combiner 14 using conventional multiplexing techniques well known in the communications art to provide an audio signal. For example, each separate audio signal can be allotted fifty kilocycles of the standard audio band associated with a conventional television channel. Since the audio band in a conventional television channel is generally two hundred and fifty kilocycles wide, five such channels can be incorporated in the band. Four of the channels will be associated with the four different quadrants, whereas the fifth channel, preferably the center channel, is associated with the normal audio channel incorporated in unmodified television systems.

Under the control of a director, control signal generator 18 will transmit control signals to television transmitter 10. These control signals will be bursts of sine waves at predetermined frequencies. FIGURE 3 shows for example four different control signals all within the video band of a conventional television channel. Each of the control signals has a frequency which is separated from the other signals by an amount that can reasonably be selected by conventional filtering circuits. Generally, the director will cause control signal generator 18 to generate several bursts of control signals of one of the frequencies. The envelope of each burst is used as hereinafter described, in the receiver to generate a pulse. Therefore, in effect, groups of control pulses are periodically received by the receiver.

Figure 4:
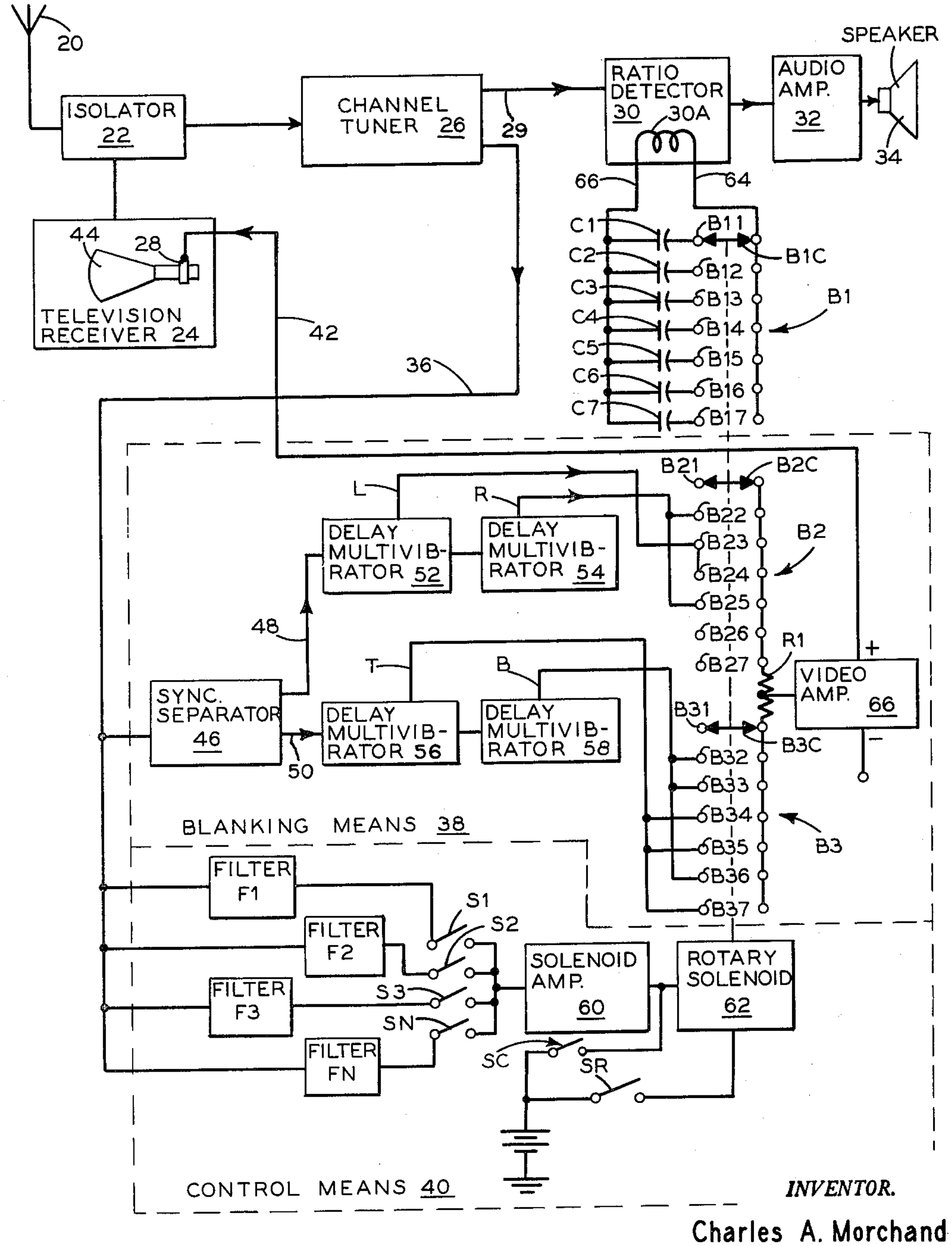
FIGURE 4 shows an exemplary embodiment of a receiver for the television system in accordance with the invention.

Television transmitter 10 of standard design accepts the audio signals from the audio signal combiner 14, the video signals from the four quadrant video source 16 and the control signals from the control signal generator 18, and transmits them within a television channel via the antenna 12 to the receiver shown in FIGURE 4. It should be noted that the television transmitter 10 also generates the appropriate horizontal and vertical synchronizing pulses which establish the television raster for each frame.

Figure 1:
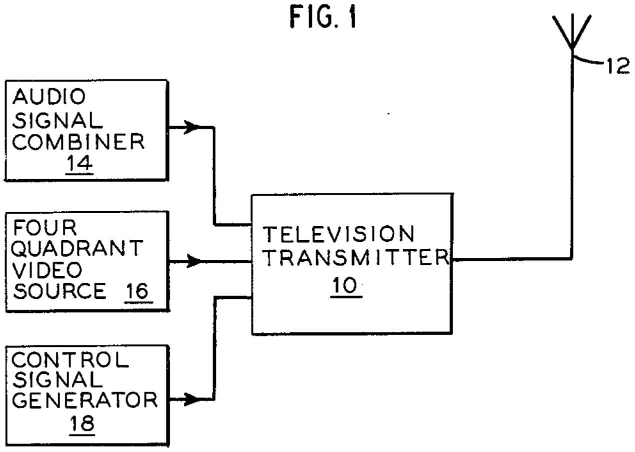
FIGURE 1 shows the block diagram of the transmitting portion of an exemplary embodiment of the invention.

Referring now to FIGURE 4, there is shown a receiver which includes an antenna 20 to receive the signals from the transmitter of FIGURE 1. These signals are fed via an isolater 22 of conventional design to the conventional television receiver 24 and to channel tuner 26. Channel tuner 26 is a conventional front end of a television receiver up to the point where the audio signals are separated from the video and synchronizing signals. The audio IF signals are fed via line 29 to the ratio detector 30 for conversion to audio signals that are fed via audio amplifier 32 to the speaker 34. The ratio detector 30 is a conventional ratio detector having a tuned secondary, except that the tuning capacitor in the secondary is not included within the block 30, as is hereinafter more fully described.

The synchronizing and video signals from the channel tuner 26 are fed via the line 36 to the blanking means 38 and the control means 40. The blanking means 38 under control of the control means 40 will transmit blanking signals via line 42 to the television receiver 24. In response to these blanking signals the cathode ray tube 44 will display only certain of the quadrants shown in FIGURE 2.

More particularly, the blanking means 38 comprises a conventional synch separator 46 which extracts the horizontal synchronizing signals from the line 36 and feeds them to the line 48, and extracts the vertical synchronizing signals from the line 36 and feeds them to the line 50. The horizontal synchronizing signals on the line 48 are fed as pulses to the first delay multivibrator 52. Upon receipt of a horizontal synchronizing pulse, delay multivibrator 52 is triggered and transmits a pulse having a duration equal to about one-half the period between horizontal synchronizing pulses. The output of delay multivibrator 52 is transmitted to the line L. The trailing edge of the output pulse from delay multivibrator 52 triggers delay multivibrator 54 which generates a pulse having a duration equal to about one-half the period of time between successive horizontal synchronizing pulses. The output of delay multivibrator 54 is connected to the line R. Similarly, the vertical synchronizing pulses are fed to delay multivibrator 56 which upon receipt of a pulse transmits a pulse on line T having a duration equal to substantially one-half the period between vertical synchronizing pulses. The trailing edge of the pulse from the output of delay multivibrator 56 triggers delay multivibrator 58 which now transmits a pulse on the line B having a duration equal to substantially one-half the period between vertical synchronizing pulses. These pulses on the lines L, R, T and B are combined to provide the blanking signals.

Control means 40 comprises filters F1, F2, F3 and FN. Each of these filters is tuned to a different frequency. The frequencies being equal to the frequencies of the control signals that are transmitted via the line 36 to control means 40. The output of each filter is connected respectively to the subject operable switches S1, S2, S3 and SN. The outputs of switches S1 to SN are connected to the input of solenoid amplifier 60. Solenoid amplifier 60, an amplifier of conventional design, has an output which drives rotary solenoid 62 which includes the stepping coil of a conventional rotary stepping switch. It should be noted that a signal from line 36 cannot pass to solenoid amplifier 60 unless the appropriate switch S which is connected to the filter F sensitive to the frequency of the signal on line 36 is closed. The stepping switch has three banks, B1, B2 and B3. Each bank comprises two pairs of fixed contacts and a common contact for bridging the pairs of fixed contacts. The common contacts B1C, B2C and B3C, associated respectively with the banks B1, B2 and B3, are mechanically ganged together and to the rotary drive mechanism of rotary solenoid 62.

It should be noted that the right hand contacts in each bank are connected together. In particular, the right hand fixed contacts of the bank B1 are connected together and to the line 64 which is connected to one arm of the secondary 30A in the ratio detector 30. The right hand fixed contacts of the bank B2 are connected to resistor R1. The right hand fixed contacts of the bank B3 are connected to resistor R2. The junction of resistors R1 and R2 is connected to the input of a conventional video amplifier 66. The left hand contacts B11 to B17 inclusive of bank B1 are respectively connected via the tuning capacitors C1 to C7 inclusive to the line 66 which is connected to the other arm of the secondary winding 30A in the ratio detector 30. Thus, when the common contact B1C is in the first position as shown, tuning capacitor C1 is connected in parallel with the secondary winding 30A. Therefore, the ratio detector 30 is tuned to the resonant frequency of the tuned circuit which includes secondary winding 30A and capacitor C1. Therefore, the ratio detector 30 will select audio signals having an intermediate frequency substantially equal to the resonant frequency of the circuit. In this manner, the particular audio bands are selected. Several of the left hand fixed contacts of the bank B2 are connected to the lines L and R. In particular, the fixed contacts B22 and B25 are connected to the line R and the fixed contacts B23 and B24 are connected to the line L. Similarly, with respect to the bank B3 the fixed contacts B32, B33 and B36 are connected to the signal line B while the fixed contacts B34, B35 and B37 are connected to the signal line T. Accordingly, with respect to the banks B2 and B3, the position of the stepping switch determines which of the blanking signals are fed to the video amplifier 66. The output of video amplifier 66 is connected via the line 42 to an adapter 28 in the television receiver 24. The adapter 28 is merely a unit comprising both a male and female plug. The male end of the plug connects into the conventional tube socket for the cathode ray tube 44 which is then connected into the female portion of the adapter 28. All normal connections from the plug to the cathode ray tube 44 are maintained except that the connection between the video output stage of the television receiver 24 to the control grid of the cathode ray tube 44 is connected in parallel with the line 42 so that the blanking signals on the line 42 can bias the control grid to cut off electron flow whenever blanking is desired. It should be noted that with some television receivers the video signal. is applied to the cathode. If such is the case, then it is only necessary to change the polarity of the blanking signals from video amplifier 66 by connected line 42 to the negative output terminal and to make sure that the adapter is connected in the cathode line.

Such a system can be used in many ways. For example, consider the type of program when an instructor is giving a course in one of the social sciences: In such a case, the switches S1 to SN would be in a control box which is within easy access to a viewer and the control signal generator 18 would be under the control of an instructor. At the start of the program, the viewer would operate the channel tuner 26 of FIGURE 4 to the channel on which the program is being transmitted. He would also momentarily close switch SR to drive the stepping switch to a home or start position. Sometime during the course of presentation including test questions requiring responses, a point might be arrived at and the instructor would direct his audience to depress, for example, switch S1 if they wish the point repeated, or to depress the switch S2 if they want the point further expanded. The instructor then, by means of control signal generator 18 (FIGURE 1), transmits a single burst of control signals of frequency $f1$ and a double burst of control signals of frequency $f2$. These control signals would be incorporated in the video signals by television transmitter 10 and would be transmitted to the receiver of FIGURE 4. The control signals would pass through channel tuner 26 to the line 36 and be presented to filters F1 to FN inclusive. The envelope of the single burst of control signals of frequency $f1$ would pass through filter F1 and the two envelopes of the two bursts of control signals of frequency $f2$ would pass through filter F2. If switch S1 is closed a single pulse is fed via solenoid amplifier 60 to the rotary solenoid 62 of the stepping switch causing it to rotate one position. If the switch S2 had been closed by the viewer, the two pulses encompassing the envelopes of the two bursts of signal of frequency $f2$ pass through solenoid amplifier 60 causing the rotary solenoid 62 to rotate the stepping switch two positions. A one step rotation would apply the signal on the line R and the signal on the line B to the video amplifier 66, which would transmit a blanking signal which blanks out the right hand half of the screen and the bottom half of the screen. Accordingly, quadrant number 1, as shown in FIGURE 2 would be the only picture presented. Similarly, if there were two steps by the stepping switch, the left hand portion of the screen of the cathode ray tube 44 and the bottom portion would be blanked, leaving only the quadrant number 2 presenting a picture.

The following table shows the relationship between the positions of the stepping switch and the portions of the base of the cathode ray tube 44 which present signals.

TABLE I

| Position | Line L | Line R | Line T | Line B | Quadrants |
|---|---|---|---|---|---|
| 1 | -------- | -------- | -------- | -------- | 1, 2, 3, 4 |
| 2 | -------- | X | -------- | X | 1 |
| 3 | X | -------- | -------- | X | 2 |
| 4 | X | -------- | X | -------- | 3 |
| 5 | -------- | X | X | -------- | 4 |
| 6 | -------- | -------- | -------- | X | 1, 2 |
| 7 | -------- | -------- | X | -------- | 3, 4 |

It should be noted that in position 1 all four quadrants or a full frame is displayed. Position 6 permits the display of the entire top half of frames whereas position 7 permits the display of the entire bottom half of frames.

It should be further noted that the switch SC connected to the input of rotary solenoid 62 (FIGURE 4) is a "one pulser" which permits the subject to select any position of the stepping switch by an appropriate number of momentary closures of the switch.

There has thus been shown an improved television system which can be used for audience participation. The system by using different quadrants of the picture enhances the versatility of such a presentation.

It will now be obvious to those skilled in the art that there are many modifications and variations which accomplish the objects of the invention and which realize many or all of its advantages but which do not depart from the spirit of the invention as defined in the claims which follow.

For example, the receiver as shown incorporates a converter which by means of a single lead can be connected to presently available television receivers. However, it should be apparent that presently available television receivers can be modified to include many of the elements of the converter. For example, the channel tuner, the synch separator, the audio amplifier and the speaker of the television receiver can be used to perform the related functions of the converter.

What is claimed is:

1. A television system comprising means for generating frames of video signals wherein each frame includes different areas, each of said areas being related to visual information of different scenes, means for generating control signals, each of said control signals having a different characteristic, means for transmitting the control signals and the video signals, means for receiving the control and video signals, a plurality of control signal detector means each responsive to a different one of the characteristics of the control signals whereby each of said detector means detects a different one of said control signals, a plurality of subject operable selector means each associated with one of said detector means, display means for receiving the video signals and being capable of displaying the visual information represented by entire frames of video signals, and means responsive to said plurality of detector means and said plurality of subject operable selector means for permitting said display means to display areas of the frames when a detector means detects its associated control signal and the related selector means is operated.

2. The system of claim 1 wherein the characteristic of the control signals is frequency and said detector means are frequency sensitive elements.

3. A television system comprising means for generating frames of video signals wherein each frame includes different areas, each of said areas being related to visual information of different scenes, means for generating a plurality of audio signals, each of said audio signals being associated with one of said different areas, means for generating control signals, each of said control signals having a different characteristic, means for transmitting the control signals, the audio signals and the video signals, means for receiving the control and video signals, a plurality of control signal detector means each responsive to a different one of the characteristic of the control signals whereby each of said detector means detects a different one of said control signals, a plurality of subject operable selector means each associated with one of said detector means, audio output means for receiving the audio signals, display means for receiving the video signals and being capable of displaying the visual information represented by entire frames of video signals, and means responsive to said plurality of detector means and said plurality of subject operable selector means for preventing said display means from displaying areas of the frames when a detector means detects its associated control signal and the related selector means is operated whereby only one area of a frame is displayed and for causing said audio output means to be only responsive to the audio signals related to said displayed area of the frame.

4. A television system comprising means for generating frames of video signals wherein each frame includes different areas, each of said areas being related to visual information of different scenes, means for generating pluralities of series of control signals, all of the control signals in one series being of the same frequency which is different from the frequency of the control signals in the other series, means for transmitting the control signals and the video signals, means for receiving the control signals and the video signals, display means responsive to the video signals to display video information represented by entire frames of video signals, blanking means for generating blanking signals occurring at different times in frame, blanking selector means having inputs for receiving said blanking signals and an output connected to said display means for controllably connecting its input to its output, a plurality of frequency sensitive detector means each responsive to a different frequency control signal, a plurality of subject operable switches, each connected to one of said detector means, and control means connected to said switches, said control means operating only when one of the frequency sensitive detector means detects a control signal and the switch connected to said detector is closed, to cause said blanking selector means to switch a different one of its inputs to its output whereby different blanking signals are transmitted to said display means to prevent the display of areas of the frame.

5. A television system comprising means for generating frames of video signals wherein each frame includes different areas, each of said areas being related to visual information of different scenes, means for generating horizontal and vertical synchronizing signals, means for generating pluralities of series of control signals, all of the control signals in one series being of the same frequency which is different from the frequency of the control signals in the other series, means for transmitting the control signals, the synchronizing signals and the video signals, means for receiving the control signals, the synchronizing signals and the video signals, display means responsive to the video and the synchronizing signals to display video information represented by entire frames of video signals as dots of light of different intensity on a plurality of horizontal lines vertically displaced from each other, means responsive to the horizontal synchronizing signals for generating first and second horizontal blanking signals for each horizontal synchronizing signal, means responsive to each vertical synchronizing signal to generate first and second vertical blanking signals, blanking selector means having inputs for receiving said blanking signals and an output connected to said display means for controllably connecting its inputs to its output, a plurality of frequency sensitive detector means each responsive to a different frequency control signal, a plurality of subject operable switches, each connected to one of said detector means and control means connected to said switches, said control means operating only when one of the frequency sensitive detector means detects a control signal and the switch connected to said detector is closed, to cause said blanking selector means to switch a different one of its inputs to its output whereby different blanking signals are transmitted to said display means which prevent areas of the frame from being displayed.

6. The system of claim 5 wherein the portions are quadrants of a frame, said vertical blanking signals each lasting as long as substantially one half the time between vertical synchronizing signals and said horizontal blanking signals each lasting as long as substantially one half the time between horizontal synchronizing signals.

7. The system of claim 5 wherein said blanking selector means and said control means is stepping switch including a common contact, a plurality of fixed contacts and a rotary drive means for positioning said moving contact on said fixed contacts, wherein the inputs to said blanking selector means are said common contacts, the output of said blanking selector means is said common contact and said control means is said rotary drive means.

8. The system of claim 7 wherein each of said detector means includes a resonant circuit tuned the frequency of one of said control signals.

9. A television system comprising means for generating frames of video signals wherein each frame includes different areas, each of said areas being related to visual information of different scenes, means for generating horizontal and vertical synchronizing signals, means for generating pluralities of series of control signals, all of the control signals in one series being of the same frequency which is different from the frequency of the control signals in the other series, means for generating a plurality of audio signals, each of the audio signals being related to a different portion of the frames, means for transmitting the control signals, the synchronizing signals, the audio signals and the video signals, means for receiving the control signals, the synchronizing signals and the video signals, display means responsive to the video and the synchronizing signals to display video information represented by entire frames of video signals as dots of light of different intensity on a plurality of horizontal lines vertically displaced from each other, audio output means for converting audio signals to an audible output, means responsive to the horizontal synchronizing signals for generating first and second horizontal blanking signals for each horizontal synchronizing signal, means responsive to each vertical synchronizing signal to generate first and second vertical blanking signals, blanking selector means having inputs for receiving said blanking signals and an output connected to said display means for controllably connecting its inputs to its output, a plurality of frequency sensitive detector means each responsive to a different frequency control signal, a plurality of subject operable switches, each connected to one of said detector means, control means connected to said switches, said control means operating only when one of the frequency sensitive detector means detects a control signal and the switch connected to said detector is closed, to cause said blanking selector means to switch a different one of its inputs to its output whereby different blanking signals are transmitted to said display means which prevent areas of the frame from being displayed and to cause said audio output means to select the audio signals related to the area of the frame being displayed by said display means.

10. The system of claim 9 wherein each of the audio signals has a different carrier frequency, said audio output means includes a tuned circuit means whose resonant frequency can be changed, and said control means and said blanking selector means is a stepping switch including two banks of fixed contacts each with a common contact means and a rotary drive means for moving said common contact means against said fixed contacts, the input means of said blanking selector means being the fixed contacts of said first bank, the output of said blanking selector means being the common contact means of said second bank, the rotary drive means being said control means, tuning elements connected between the fixed contacts of said second bank and said tuned circuit means and means connecting the common contact means of said second bank to said tuned circuit means.

11. An audio information transfer system comprising a plurality of sources of audo signals representing different audio information, means cooperating with said sources for transmitting a plurality of control signals having unique characteristics, receiving means for receiving the audio signals from said sources, audio signal transducing means for converting audio signals to audible sounds, selection means connected to said receiving means and said audio signal transducing means for selecting the audio signals from at least one of said sources at a time and transferring the selected audio signals to said audio signal transducing means, control signal receiving means including a plurality of outputs and input means for receiving said control signals and separating the control signals according to said characteristics so that when a control signal is present at said input means a signal is transmitted from a pre-assigned one of said outputs, a plurality of subject-operable switch means, each of said subject-operable switch means including at least an input and an output, each of said subject-operable switch means being pre-assigned to one of the outputs of said control signal receiving means, means for connecting the inputs of said subject-operable switch means to the outputs of said control signal receiving means respectively, so that each output of said control signal receiving means is connected to the input of the subject-operable switch means pre-assigned thereto, means for connecting the outputs of said subject-operable switch means to said selection means for causing said selection means to select the audio information from another source only when a signal passes from an output of said signal receiving means via its pre-assigned subject-operable switch means to said selection means.

References Cited by the Examiner

UNITED STATES PATENTS

| | | | |
|---|---|---|---|
| 2,840,815 | 6/1958 | Andres et al. | 179—15 |
| 3,008,000 | 11/1961 | Morchand | 178—5.6 |

OTHER REFERENCES

German (Ausgleschrift), May 29, 1964, 178–F & M.

J. A. O'BRIEN, *Assistant Examiner.*

DAVID G. REDINBAUGH, *Primary Examiner.*